(12) United States Patent
Nagatsuka et al.

(10) Patent No.: US 7,301,301 B2
(45) Date of Patent: Nov. 27, 2007

(54) ELECTRIC CAR CONTROL APPARATUS

(75) Inventors: Yoshio Nagatsuka, Tokyo (JP); Takeo Matsumoto, Tokyo (JP); Shouichi Kawamoto, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 81 days.

(21) Appl. No.: 10/574,533

(22) PCT Filed: Apr. 1, 2005

(86) PCT No.: PCT/JP2005/006503

§ 371 (c)(1),
(2), (4) Date: Apr. 3, 2006

(87) PCT Pub. No.: WO2006/016438

PCT Pub. Date: Feb. 16, 2006

(65) Prior Publication Data

US 2007/0019449 A1    Jan. 25, 2007

(30) Foreign Application Priority Data

Aug. 9, 2004  (JP) ............................. 2004-232483

(51) Int. Cl.
*H02M 5/453* (2006.01)
*H02P 27/06* (2006.01)
(52) U.S. Cl. .................. 318/801; 318/812; 318/817; 318/805; 318/811; 318/800; 363/37; 363/96
(58) Field of Classification Search ............ None
See application file for complete search history.

(56) References Cited

U.S. PATENT DOCUMENTS 5,621,628 A * 4/1997 Miyazaki et al. ........... 363/37

5,627,742 A   5/1997 Nakata et al.
5,742,493 A * 4/1998 Ito et al. ..................... 363/37

(Continued)

FOREIGN PATENT DOCUMENTS

JP         5-244702 A     9/1993

(Continued)

OTHER PUBLICATIONS

International Search Report dated Jul. 26, 2005.

*Primary Examiner*—Lincoln Donovan
*Assistant Examiner*—Eduardo Colon
(74) *Attorney, Agent, or Firm*—Buchanan Ingersoll & Rooney PC

(57) ABSTRACT

In an electric car control apparatus for driving an induction motor, detection accuracy of a DC voltage is improved. A DC power supply device is provided which has a maximum potential terminal A, an intermediate potential terminal B, a minimum potential terminal C, an upstream side capacitor 6 between the maximum potential terminal A and the intermediate potential terminal B, and a downstream side capacitor 7 between the intermediate potential terminal B and the minimum potential terminal C. Also, an overvoltage suppression part is provided which includes a resistor 8 and a thyristor 9 between the maximum potential terminal A and the minimum potential terminal C. Further, provision is made for a downstream voltage sensor 10 between the intermediate potential terminal B and the minimum potential terminal C, an upstream voltage sensor 11 between a junction of the resistor 8 and the thyristor 9 and the intermediate potential terminal B, and a three level inverter 3 connected to the maximum potential terminal A, the intermediate potential terminal B and the minimum potential terminal C for supplying AC power to the induction motor. The three level inverter 3 is controlled by using detected voltages of the downstream voltage sensor 10 and the upstream voltage sensor 11.

2 Claims, 2 Drawing Sheets

U.S. PATENT DOCUMENTS

| | | | |
|---|---|---|---|
| 5,790,396 A * | 8/1998 | Miyazaki et al. | 363/96 |
| 6,594,164 B2 * | 7/2003 | Suzuki | 363/69 |
| 7,088,073 B2 * | 8/2006 | Morishita | 318/801 |
| 2001/0022736 A1 * | 9/2001 | Suzuki | 363/69 |
| 2004/0145337 A1 * | 7/2004 | Morishita | 318/801 |

FOREIGN PATENT DOCUMENTS

| | | |
|---|---|---|
| JP | 7-075345 A | 3/1995 |
| JP | 8-308252 A | 11/1996 |
| JP | 9-233805 A | 9/1997 |

* cited by examiner

ELECTRIC CAR CONTROL APPARATUS

This application is based on and claims priority to Japanese Application No. 2004-232483, filed Aug. 9, 2004 and International Application No. PCT/JP2005/006503, filed Apr. 1, 2005 designating the U.S., the entire contents of both of which are hereby incorporated by reference.

TECHNICAL FIELD

The present invention relates to an electric car control apparatus for controlling and driving an induction motor of an electric car.

BACKGROUND ART

A known power conversion device with a three level (PWM) converter has two DC voltage detectors that are provided for two filter capacitors, respectively, connected with a DC side of the three level converter for detecting the individual voltages of the capacitors, and the three level converter is PWM controlled based on the voltages of the filter capacitors detected by the two DC voltage detectors, respectively (see, for example, a first patent document).

However, when a voltage across opposite ends of each filter capacitor becomes higher than an ordinary voltage owing to a rapid variation of a load or the like, an abnormal voltage will be applied to a semiconductor device of the three level converter.

In addition, in order to prevent a detrimental effect as referred to above, there is a method of connecting an overvoltage suppression circuit comprising an overvoltage suppression resistor and a thyristor in parallel with the two filter capacitors. In operation, when a voltage across opposite ends of one filter capacitor becomes higher than a predetermined value, it is detected by an overvoltage detector, and the thyristor is fired to short-circuit that filter capacitor through the overvoltage suppression resistor, so that the energy accumulated in that filter capacitor is released whereby an AC switch arranged on a power supply side of the three level converter is opened after a predetermined time, thus cutting off a follow or dynamic current (see, for example, a second patent document).

In this method, however, when the AC switch does not perform normal opening operation due to a failure or the like, a current detector for detecting a current flowing through the overvoltage suppression resistor is required so as not to invite a heated burnout of the overvoltage suppression resistor, thus resulting in that the device becomes excessively large.

Accordingly, in order to solve the problems as referred to above, there is a method of detecting false firing of a thyristor in an electric car control apparatus with a three level (PWM) inverter, in which a first voltage sensor is connected in parallel to the thyristor to detect an intermediate direct current full voltage. Here, a second voltage sensor is connected in parallel to a filter capacitor, which is connected to a negative terminal side of a terminal of the three level inverter, for detecting a downstream half voltage in the form of a terminal to terminal voltage of the filter capacitor, whereby the pulse width of the three level inverter is controlled by using the voltage values detected by the first and second voltage sensors so as to make the value of an upstream half voltage and the value of the downstream half voltage of the intermediate DC voltage equal to each other (see, for example, a third patent document).

In this case, the upstream half voltage, which is a terminal to terminal voltage of the filter capacitor connected to a positive terminal side of the three level inverter, is a value which is obtained by subtracting the downstream voltage detected by the second voltage sensor connected in parallel to the filter capacitor connected to a negative terminal side of the terminal of the three level inverter from the full voltage detected by the first voltage sensor connected in parallel to the thyristor. However, in case where the resolution of the first voltage sensor is lower than the resolution of the second voltage sensor, the upstream half voltage calculated from the voltage detected from these two voltage sensors is lower in accuracy than the downstream half voltage directly detected, and as a result, the accuracy of the control also becomes low. Accordingly, in order to perform control according to this voltage detection system, it is necessary to match the resolutions of the voltage sensors to the lower one. Here, note that a similar discussion can be made for the three level converter.

[First Patent Document] Japanese patent application laid-open No. H 11-113263

[Second Patent Document] Japanese patent application laid-open No. H 7-154974

[Third Patent Document] Japanese patent application laid-open No. H 8-33102

DISCLOSURE OF THE INVENTION

[Problems to be Solved by the Invention]

In the known electric car control apparatus, the overvoltage suppression circuit is provided for preventing the three level converter and the semiconductor device thereof from being subjected to an abnormal voltage, but with the provision of the overvoltage suppression circuit, the current detector for detecting the current of the overvoltage suppression resistor is required. In addition, there is the method of detecting false firing of the thyristor, in which in order to exclude the use of the current detector, the first voltage sensor is connected in parallel to the thyristor to detect the intermediate direct current full voltage. With this method, however, there is a problem that it is necessary to match the resolutions of the voltage sensors to the lower one.

[Means for Solving the Problems]

An electric car control apparatus according to the present invention is an electric car control apparatus for driving an induction motor by means of electric power supplied by overhead wiring, the apparatus including: a DC power supply device having a maximum potential terminal, an intermediate potential terminal, a minimum potential terminal, an upstream side capacitor connected between the maximum potential terminal and the intermediate potential terminal, and a downstream side capacitor connected between the intermediate potential terminal and the minimum potential terminal; an overvoltage suppression part having a resistor and a thyristor and being connected between the maximum potential terminal and the minimum potential terminal; a downstream voltage sensor connected in series between the intermediate potential terminal and the minimum potential terminal; an upstream voltage sensor connected between a junction of the resistor and the thyristor, and the intermediate potential terminal; and a three level inverter connected to the maximum potential terminal, the intermediate potential terminal and the minimum potential terminal for supplying AC power to the induction motor;

wherein the three level inverter is controlled by using voltages detected by the downstream voltage sensor and the upstream voltage sensor.

[Effects of the Invention]

According to the present invention, it is possible to make the resolutions of the two voltage sensors for detecting the upstream voltage and the downstream voltage, respectively, of the DC voltage equal to each other, so accuracy in the voltage detection can be improved, and highly accurate control can be performed.

BEST MODE FOR CARRYING OUT THE INVENTION

The present invention is intended to obviate the problems as referred to above, and is to provide an electric car control apparatus which is improved in the detection accuracy of a DC voltage.

Embodiment 1

Figure 1:
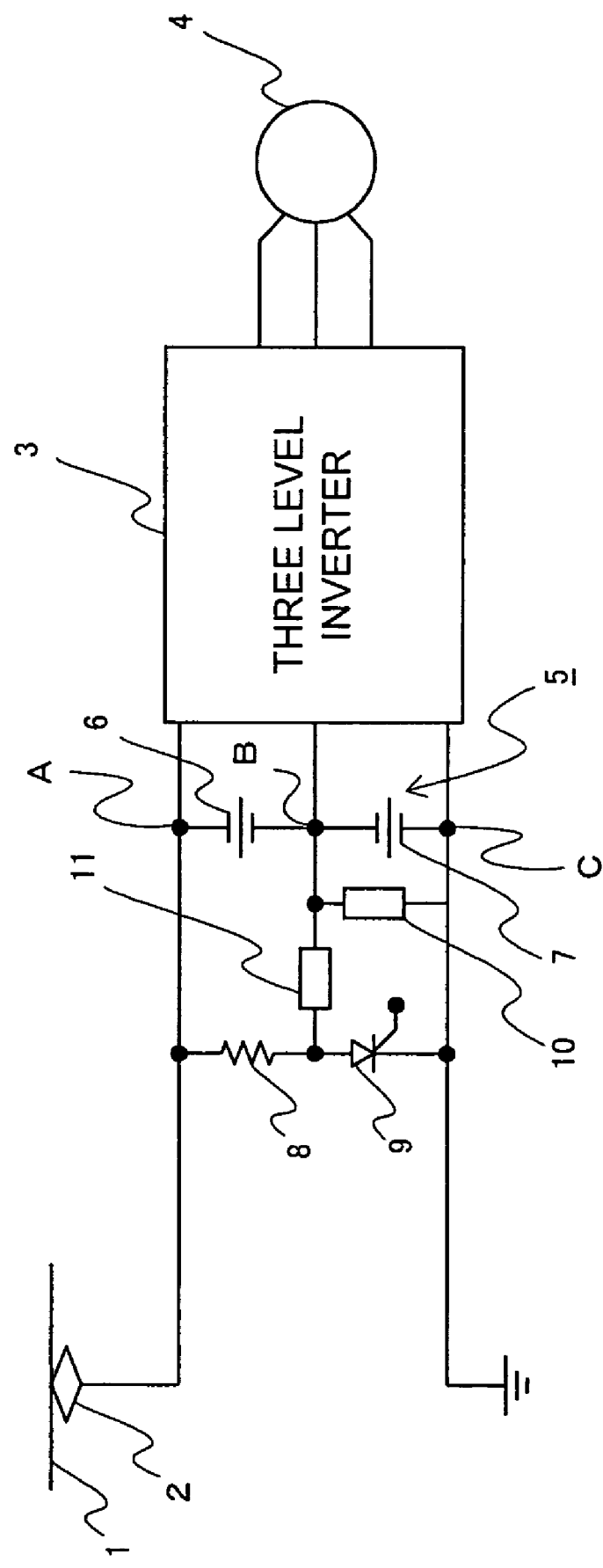
FIG. 1 is a block diagram showing an electric car control apparatus according to a first embodiment of the present invention (Embodiment 1).

FIG. 1 is a block diagram that shows an electric car control apparatus according to a first embodiment of the present invention. In FIG. 1, DC power collected from overhead wiring 1 by means of a pantograph 2 is input to a three level inverter 3 having a maximum potential terminal A, an intermediate potential terminal B and a minimum potential terminal C, where it is converted to AC power to drive an induction motor 4. In addition, a filter capacitor circuit 5, which serves to divide a DC voltage between terminals of the three level inverter 3 into two voltage components, is connected in parallel to the three level inverter 3. The filter capacitor circuit 5 is composed of an upstream filter capacitor 6 (upstream side capacitor) and a downstream filter capacitor 7 (downstream side capacitor) connected in series with each other. The upstream filter capacitor 6 is connected between the maximum potential terminal A and the intermediate potential terminal B of the three level inverter 3, and the downstream filter capacitor 7 is connected between the intermediate potential terminal B and the minimum potential terminal C of the three level inverter 3.

Here, in the configuration of FIG. 1, DC power is obtained from the overhead wiring, so a DC power supply device is constituted only by the upstream filter capacitor 6 and the downstream filter capacitor 7 connected in series with each other. In case where AC power is obtained from the overhead wiring, a DC power supply device has a converter.

In addition, an overvoltage suppression part comprising a resistor 8 and a thyristor 9 connected between in series with each other is connected between the maximum potential terminal A and the minimum potential terminal C in a terminal side of the three level inverter 3. The resistor 8 and the thyristor 9 are connected in such a manner that the resistor 8 is located on a positive terminal side of the three level inverter 3, and the thyristor 9 is located on a negative terminal side of the three level inverter 3. With such an arrangement, the overvoltage suppression part is connected in parallel to the filter capacitor circuit 5. Here, note that the configuration and operation of the three level inverter 3 are similar to those of a known apparatus.

The downstream voltage sensor 10 is connected between the intermediate potential terminal B and the minimum potential terminal C among the terminals of the three level inverter 3. Also, the upstream voltage sensor 11 is connected between a junction of the resistor 8 and the thyristor 9 and a junction of the upstream filter capacitor 6 and the downstream filter capacitor 7. Here, note that the junction of the downstream voltage sensor 10 and the upstream voltage sensor 11 is connected to the intermediate potential terminal B of the three level inverter 3.

In such a voltage detection system for the electric car control apparatus, since the resistor 8 is sufficiently small as compared with the internal resistance of each of the downstream voltage sensor 10 and the upstream voltage sensor 11, a voltage drop in the resistor 8 of the DC voltage supplied from the overhead wiring 1 can be assumed to be substantially zero, so it can be said that a full voltage will be impressed to the thyristor 9. Accordingly, it can be assumed that the sum of the voltage values detected by the downstream voltage sensor 10 and the upstream voltage sensor 11 is substantially the full voltage impressed to the circuit of FIG. 1.

Moreover, since the junction of the downstream voltage sensor 10 and the upstream voltage sensor 11 is arranged at the intermediate potential terminal B of the three level inverter 3, a downstream half voltage will be impressed to the downstream voltage sensor 10, and an upstream half voltage is impressed to the upstream voltage sensor 11. As a result, the upstream half voltage becomes substantially equal to the terminal to terminal voltage of the upstream filter capacitor 6.

When the thyristor 9 is in a short-circuited state due to a failure or false firing of the thyristor 9, the electric charge accumulated in the filter capacitor circuit 5 is discharged so that the upstream half voltage detected by the upstream voltage sensor 11 decreases. As a result, the failure and false firing of the thyristor 9 can be detected by monitoring the upstream half voltage detected by the upstream voltage sensor 11.

Thus, the two voltage sensors connected in series are connected in parallel to the thyristor 9 so as to detect a DC full voltage, whereas for detection of a half voltage, the junction of the two voltage sensors connected in parallel to the thyristor 9 is connected to the junction of the upstream filter capacitor 6 and the downstream filter capacitor 7, as a result of which the resolutions of the two voltage sensors can be made equal to each other.

Further, there is no need to separately provide a current sensor for detection of false firing of the thyristor 9, so it is possible to reduce the size of the apparatus.

Embodiment 2

Figure 2:
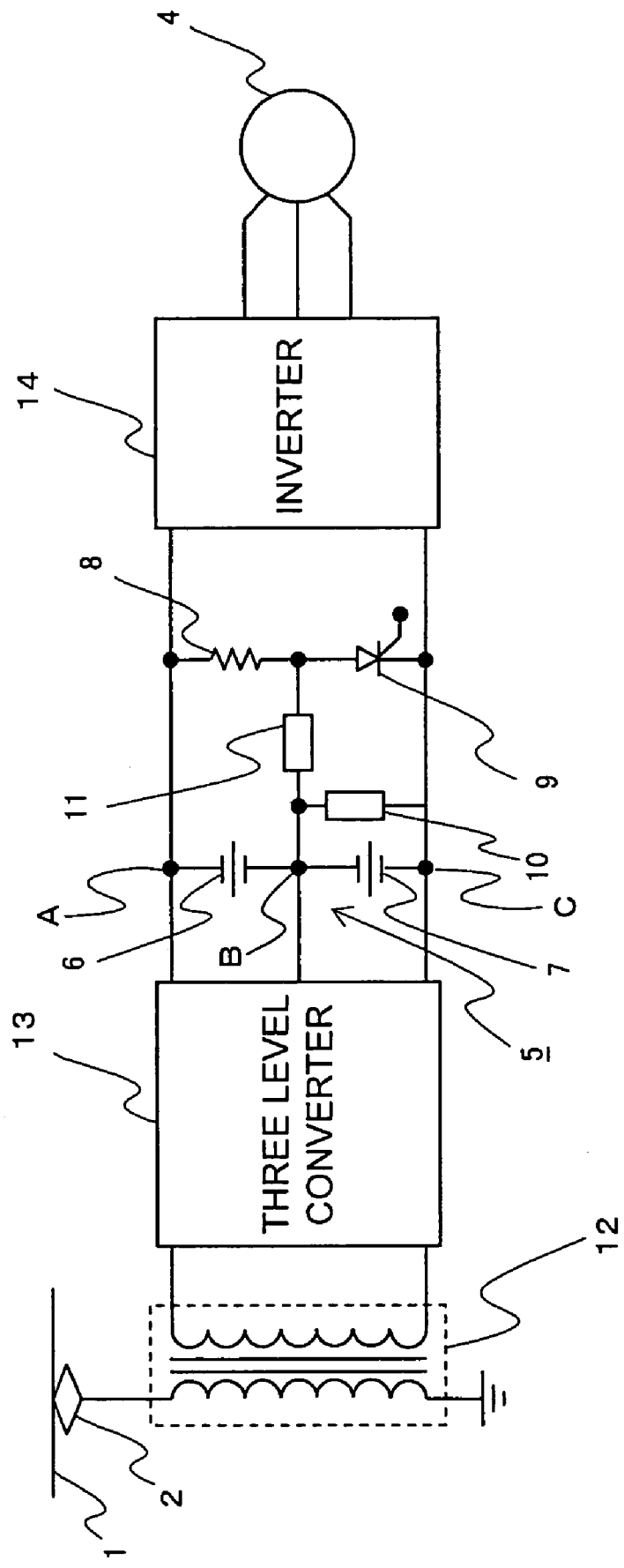
FIG. 2 is a block diagram showing an electric car control apparatus according to a second embodiment of the present invention (Embodiment 2).

FIG. 2 is a block diagram that shows an electric car control apparatus according to a second embodiment of the present invention. In FIG. 2, AC power supplied by the overhead wiring 1 is input to the three level converter 13 through transformer 12, and DC power output from the maximum potential terminal, the intermediate potential terminal and the minimum potential terminal is input to an inverter 14. The construction of the second embodiment other than the above is similar to that of the first embodiment.

In the three level converter 13, the two voltage sensors connected in series are connected in parallel to the thyristor 9 so as to detect a DC full voltage, and for detection of a half voltage, the junction of the two voltage sensors connected in parallel to the thyristor 9 is connected to the junction of the upstream filter capacitor 6 and the downstream filter capacitor 7. Consequently, it is possible to make the resolutions of the voltage sensors equal to each other, as in the case of the three level inverter 3 of the first embodiment. In addition, there is no need to provide a current sensor for detection of false firing of the thyristor 9, and hence the apparatus can be reduced in size.

The invention claimed is:

1. An electric car control apparatus for driving an induction motor by means of electric power supplied by overhead wiring, characterized by comprising:
   a DC power supply device having a maximum potential terminal, an intermediate potential terminal and a minimum potential terminal for converting said electric power so as to supply DC power, said DC power supply device further having an upstream side capacitor connected between said maximum potential terminal and said intermediate potential terminal, and a downstream side capacitor connected between said intermediate potential terminal and said minimum potential terminal;
   an overvoltage suppression part having a resistor and a thyristor and being connected between said maximum potential terminal and said minimum potential terminal;
   a downstream voltage sensor connected in series between said intermediate potential terminal and said minimum potential terminal;
   an upstream voltage sensor connected between a junction of said resistor and said thyristor, and said intermediate potential terminal; and
   a three level inverter connected to said maximum potential terminal, said intermediate potential terminal and said minimum potential terminal for supplying AC power to said induction motor;
   wherein said three level inverter is controlled by using voltages detected by said downstream voltage sensor and said upstream voltage sensor.

2. An electric car control apparatus for driving an induction motor by means of electric power supplied by overhead wiring, characterized by comprising:
   a three level converter having a maximum potential terminal, an intermediate potential terminal and a minimum potential terminal for converting AC power supplied from said overhead wiring into DC power;
   an upstream side capacitor connected between said maximum potential terminal and said intermediate potential terminal;
   a downstream side capacitor connected between said intermediate potential terminal and said minimum potential terminal;
   an overvoltage suppression part having a resistor and a thyristor and being connected between said maximum potential terminal and said minimum potential terminal;
   a downstream voltage sensor connected in series between said intermediate potential terminal and said minimum potential terminal;
   an upstream voltage sensor connected between a junction of said resistor and said thyristor, and said intermediate potential terminal; and
   an inverter at least connected to said maximum potential terminal and said minimum potential terminal for supplying AC power to said induction motor;
   wherein said three level converter is controlled by using voltages detected by said downstream voltage sensor and said upstream voltage sensor.

* * * * *